(12) United States Patent
Tran

(10) Patent No.: US 7,416,298 B2
(45) Date of Patent: Aug. 26, 2008

(54) METHODS AND APPARATUS FOR LENSES AND FRAMES AND EYEGLASSES

(76) Inventor: Tri Khai Tran, 7269 Winthrop La., Mobile, AL (US) 36695

( * ) Notice: Subject to any disclaimer, the term of this patent is extended or adjusted under 35 U.S.C. 154(b) by 12 days.

(21) Appl. No.: 11/471,004

(22) Filed: Jun. 20, 2006

(65) Prior Publication Data

US 2007/0291219 A1      Dec. 20, 2007

(51) Int. Cl.
*G02C 1/02* (2006.01)
*G02C 5/00* (2006.01)
(52) U.S. Cl. .................. 351/110; 351/140; 351/146; 351/154

(58) Field of Classification Search ............... 351/110, 351/140–142, 145, 146, 154
See application file for complete search history.

(56) References Cited

U.S. PATENT DOCUMENTS

| 2,257,224 | A  | * | 9/1941  | Bouchard ............ 351/109 |
| 6,007,200 | A  | * | 12/1999 | Tachibana ........... 351/110 |
| 6,170,950 | B1 | * | 1/2001  | Yoshida .............. 351/110 |
| 7,048,374 | B2 | * | 5/2006  | Ng ..................... 351/124 |
| 2003/0133071 | A1 | * | 7/2003  | Ahn ................... 351/110 |
| 2005/0286012 | A1 | * | 12/2005 | Ogren et al. ......... 351/41 |

* cited by examiner

*Primary Examiner*—Huy K Mai

(57) ABSTRACT

Methods and apparatus for coupling lenses and frames, and eyeglasses, are provided in which a flexible washer (34) is compressed to engage a lens (16).

13 Claims, 4 Drawing Sheets

US 7,416,298 B2

METHODS AND APPARATUS FOR LENSES AND FRAMES AND EYEGLASSES

TECHNICAL FIELD OF THE INVENTION

This invention relates generally to eyeglasses, and more particularly to methods and apparatus for coupling lenses and frames and for eyeglasses.

BACKGROUND OF THE INVENTION

Eyeglasses generally comprise two lenses and a frame. Examples of frames include, without limitation, those that retain the lenses by holding them in a groove around the perimeter of the lenses, and three-piece frames that include two ear pieces and a nose bridge attached to the lenses (such as shown in prior art FIG. 1).

Whatever the frame style, it is often desirable to change the lenses held by the frame. For example, a wearer's prescription may change, or lenses may become damaged, thus motivating lens changes. Or, different lenses may be suitable for different environments or uses, and a wearer may desire to change out lenses accordingly, while using the same frame. For example, and without limitation, a wearer may desire to change from sunglasses lenses to lenses with a bifocal reader segment, or from lenses with one color tint to another color tint.

Initial coupling of frames and lenses, which is generally performed by eyeglass professionals, is relatively precise work and can be difficult. For example, with three-piece drill-mount frames, the frames are often attached to the lenses by drilling holes in the lenses, and passing shafts from the frames through the holes. In some cases, the shafts are threaded to accommodate a nut for securing the attachment. In other cases, the shafts are pressed into a receiving cap to secure the lens attachment. Whatever the approach, later changing of the lenses is not easily accomplished.

Therefore, a need has arisen for improved methods and apparatus for coupling lenses and frames, and improved eyeglasses.

SUMMARY OF THE INVENTION

In accordance with the teachings of the present invention, methods and apparatus for coupling lenses and frames, and eyeglasses, are disclosed which overcome limitations associated with the prior art.

In a particular embodiment, eyeglasses are provided that include at least one lens, and the lens includes a passageway. A flexible washer is coupled to a frame, and positioned within the lens passageway. The flexible washer is compressed so as to cause it to expand outward and engage with the lens within the passageway. The lens is held by the engagement of the washer with the lens.

Also, in a particular embodiment, a method of coupling frames and lenses is provided that includes providing a passageway in a lens, positioning a flexible washer within the lens passageway, and compressing the flexible washer such that the washer engages with the lens within the lens passageway.

An important technical advantage of the present invention is that lenses may be easily coupled to and released from frames.

BRIEF DESCRIPTION OF THE DRAWINGS

Reference is made in the description to the following briefly described drawings, wherein like reference numerals refer to corresponding elements.

DETAILED DESCRIPTION OF THE INVENTION

Figure 1:
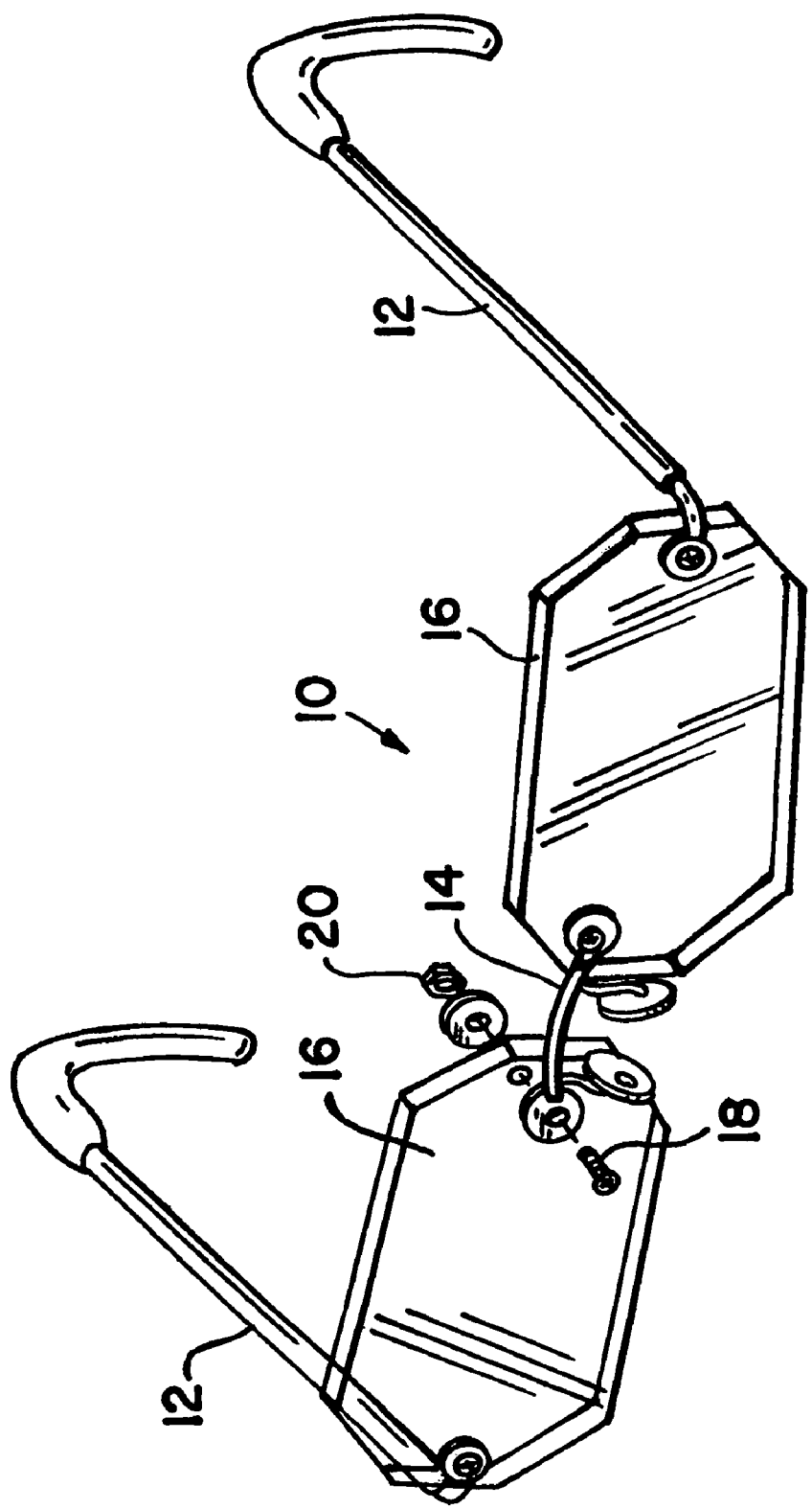
FIG. 1 illustrates a prior art three-piece frame and pair of lenses.

FIG. 1 illustrates a prior art three-piece frame 10 and pair of lenses. As shown, the frame 10 includes two ear-piece sections 12, a nose bridge section 14, and two lenses 16. As illustrated, the lenses 16 are coupled to the frames with a threaded bolt 18 and nut 20. The present invention is directed to an improvement over the methods and apparatus used to couple frames and lenses, and to improved eyeglasses. For convenience, the reference numbers 10, 12, 14, and 16 will be used to refer to the general frame and lens components, both of the prior art and the present invention. Furthermore, the reference numeral 10 is used herein to refer to all or any part of the frame, and the term "frame" refers to any device used to hold one or more lenses, whether it be a one-piece frame, a multiple piece frame, and any one or more of the parts of a multiple piece frame.

Figure 2:
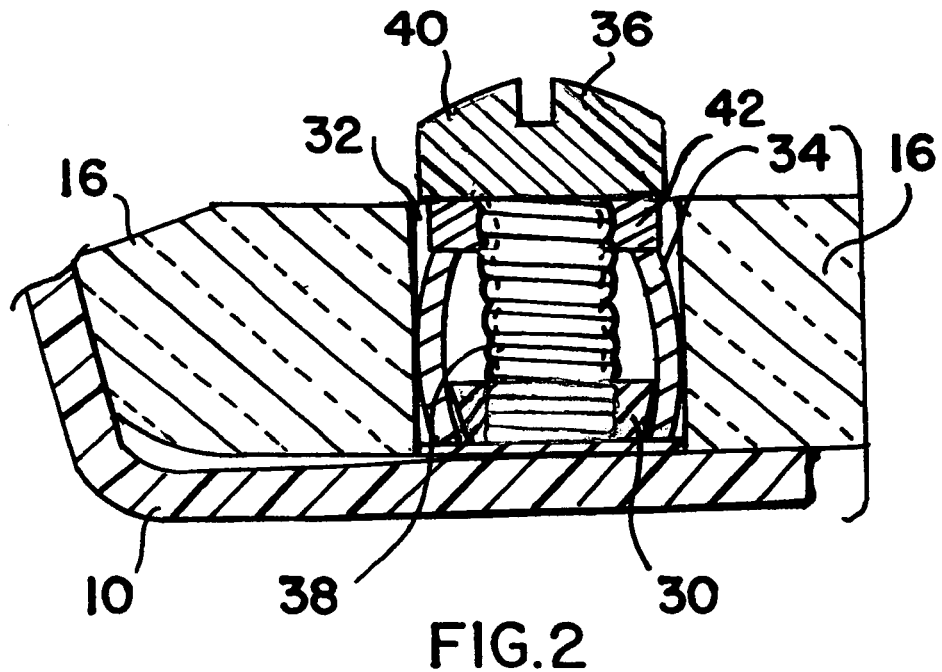
FIG. 2 illustrates a sectional view of a particular embodiment of a frame-lens coupling apparatus according to one aspect of the present invention.

FIG. 2 illustrates one embodiment of an apparatus according to one aspect of the present invention. As shown, frame component 10 includes a receiving receptacle 30. Lens 16 is drilled to include, or otherwise formed with, a passageway 32. The lens 16 is coupled to the frame 10 by a flexible washer 34 that is expandable within the passageway 32 to engage the lens 16 and hold it with an interference fit. The expansion of the washer 34 is accomplished through the use of a compressing member. In the illustrated example, the compressing member is a screw (which may also be considered a bolt) 36, which includes a threaded shaft 38 and head 40. Head 40 may include any suitable feature for facilitating its turning, for example, and without limitation, a groove or other features for receiving a driver, or flat sides for facilitating turning with a socket or wrench.

The end of shaft 38 is threaded into threaded receptacle 30. As the screw 36 is screwed into the receptacle 30, head 40 compresses washer 34, causing it to expand outward for engagement with the lens 16. As the screw 36 is screwed out, the washer 34 relaxes to its un-expanded state, releasing the lens 16.

Head 40 may act directly on the washer 34, or an intermediate device, such as a washer 42, may be used between head 40 and washer 34. The flexible washer 34 may be made of any suitably flexible material, for example, and without limitation, plastic or silicon.

In operation, lens 16 is positioned so that screw 36 and flexible washer 34 are surrounded by passageway 32. By simply turning the screw 36, the lens 16 is quickly and easily coupled to, or released from, the frame 10. Thus, anyone— including any eyeglass professional or the owner of the eyeglasses—may easily change lenses that are coupled to the frames.

Although the term "flexible washer" is used herein to describe the member that engages the lens 16, it should be understood that any compressible member capable of engaging the lens is included within that term, including, without limitation, grommets, bushings, and rubber or plastic pieces, whether separate pieces or formed integrally with the frame 10.

It is preferred that shaft 38 and receptacle 30 be formed so as to prevent their separation, for example with a stop that prevents the screw 36 from being screwed completely out of the receptacle 30. However, they need not be so formed.

Figure 3:
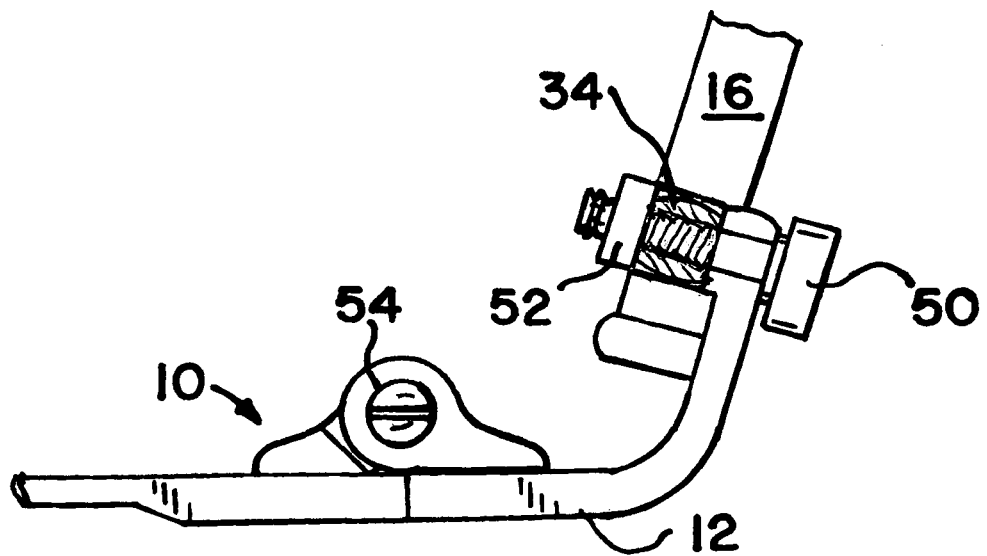
FIG. 3 illustrates a sectional view of another particular embodiment of a frame-lens coupling apparatus according to one aspect of the present invention.

FIG. 3 illustrates another embodiment of an apparatus according to one aspect of the present invention. In this embodiment, expandable washer 34 is compressed with a bolt 50 and nut 52. Bolt 50 passes through a hole formed in the frame 10. The tightening of bolt 50 and nut 52 causes nut 52 to act upon the washer 34 to expand the washer 34 for engagement with the lens 16. The loosening of bolt 50 and nut 52 relaxes the washer 34 and allows the lens 16 to be separated from the frame 10. A hinge 54 is shown on frame 10 as an example only, and any frame style may be used with any of the embodiments disclosed herein.

Figure 4:
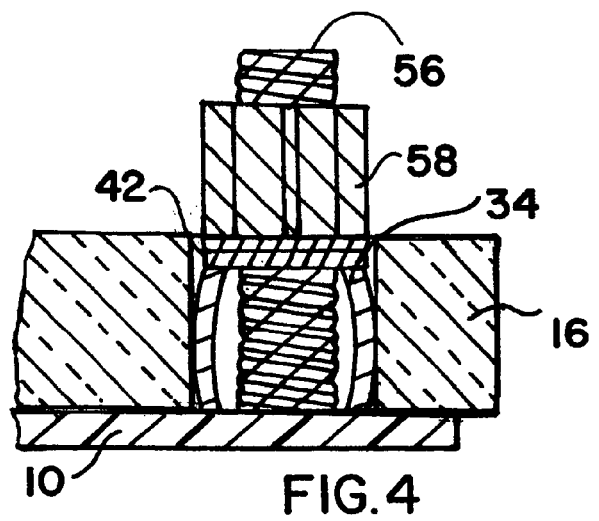
FIG. 4 illustrates a sectional view of another particular embodiment of a frame-lens coupling apparatus according to one aspect of the present invention.

FIG. 4 illustrates a variation to the embodiments shown in FIGS. 2 and 3, in which a threaded shaft 56 is formed with or otherwise coupled to the frame 10. A nut 58 is simply threaded onto the shaft 56 to compress flexible washer 34 for engagement with the lens 16. A washer 42 may also be included, as discussed above.

Figure 5:
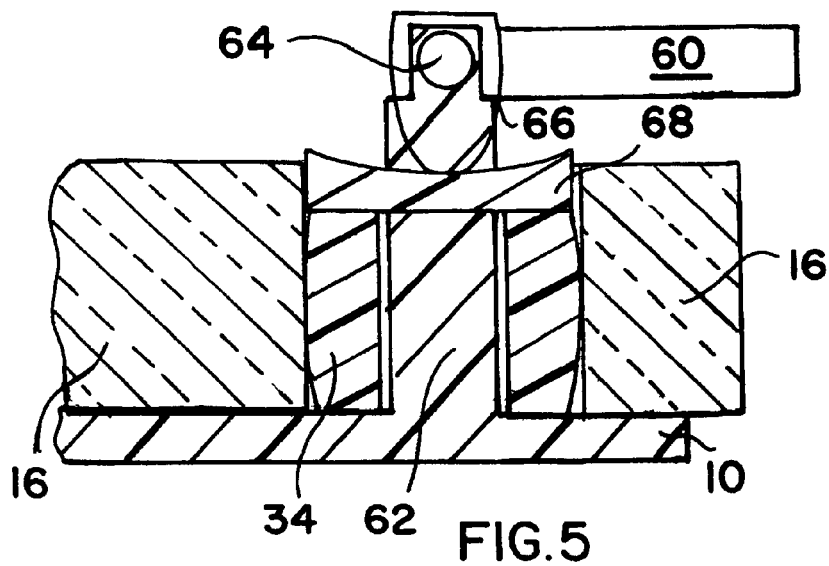
FIG. 5 illustrates a sectional view of another particular embodiment of a frame-lens coupling apparatus according to one aspect of the present invention.

FIG. 5 illustrates another embodiment of an apparatus according to one aspect of the present invention. The embodiment shown in FIG. 5, similar to the previously described embodiment, uses a flexible washer 34 to engage with the lens 16. However, in this embodiment, the flexible washer 34 is compressed and released with a latch 60 that is operated from the inside side of the eyeglasses.

As shown in FIG. 5, frame 10 is formed with a post 62 to which a latch 60 is coupled. Latch 60 pivots about a pin 64 that passes though post 62. Latch 60 includes a cam 66 that engages a washer (or "stop") 68. Washer 68 is contoured to operate in cooperation with the cam 66 to compress flexible washer 34 when the latch 60 is in its latched position, and to allow the flexible washer 34 to relax when the latch 60 is opened. In particular, as shown in the example of FIG. 4, the washer 68 may have a concave contour on its outer surface to cooperate with the contour of cam 66. The inside surface of washer 68 may be flat to engage with flexible washer 34. Washer 68 may be separate from or formed as part of flexible washer 34.

Figure 6A:
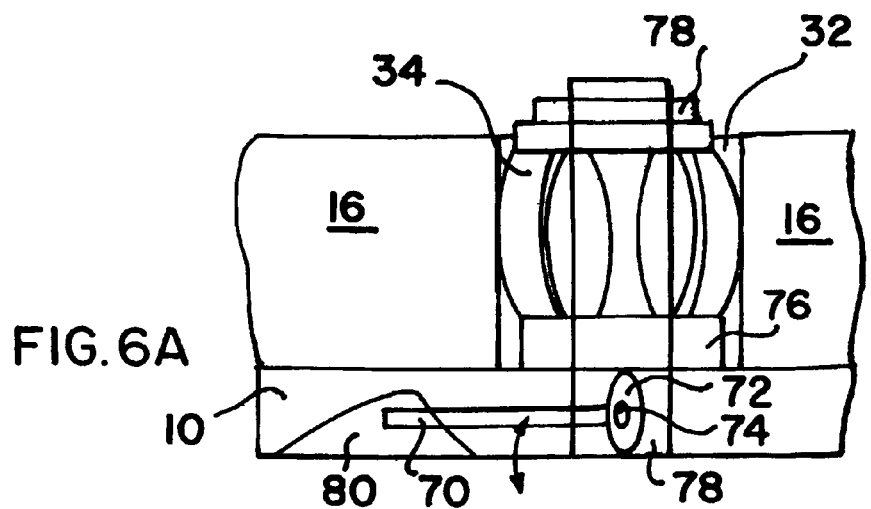
FIG. 6 illustrates a front view and a sectional view another particular embodiment of a frame-lens coupling apparatus according to one aspect of the present invention.
Figure 6B:
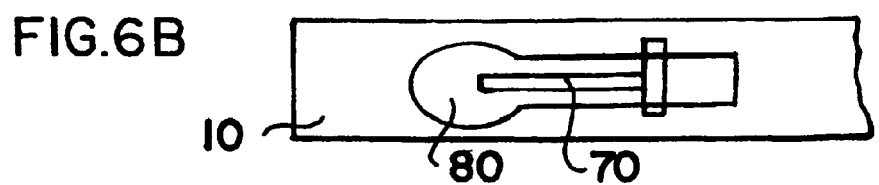

FIGS. 6A and 6B illustrate another embodiment of an apparatus according to one aspect of the present invention. The embodiment shown in FIGS. 6A (top sectional view) and 6B (front view of latch) is similar to the latch embodiment of FIG. 5, but in this example the latch is operated from the outside side of the eyeglasses.

As illustrated, a latch 70 includes a cam 72 rotating about a pin 74. When latching the latch 70, the cam 72 operates either by pushing stop 76, or pulling stop 78, so as to compress flexible washer 34 for engagement with lens 16. Any suitable mechanism may be used for linking the cam 72 with the stops. Stop 76 may include a boss surface that fits within the passageway 78 of frame 10 for interaction with cam 72. A fingerhole 80 may be included for facilitating access to the latch 70.

In operation, lens 16 is positioned so that stops (or "washers") 76 and 78, and flexible washer 34, are surrounded by passageway 32 of lens 16. By simply rotating the latch 70, the lens 16 is quickly and easily coupled to, or released from, the frame 10.

Figure 7:
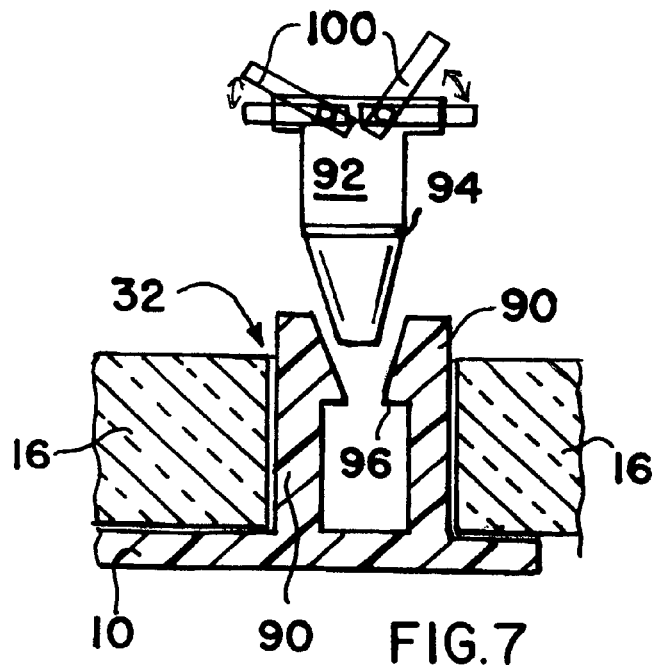
FIGS. 7 (sectional view) and 8 illustrate another particular embodiment of a frame-lens coupling apparatus according to one aspect of the present invention.
Figure 8:
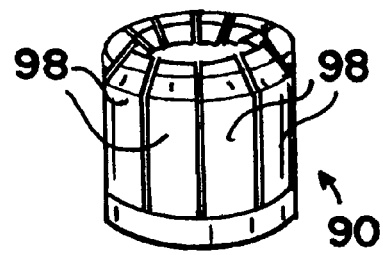

FIGS. 7 and 8 illustrate another embodiment of an apparatus according to one aspect of the present invention. As shown in FIG. 7, frame 10 may be formed with or coupled to an expandable receptacle 90 (which may be considered a flexible washer). A pin 92 engages with receptacle 90 to expand it for engagement with the lens 16. The outer sides of receptacle 90 are preferably formed with, coated with, or surrounded or shrouded by, a soft material such as silicon for friction engagement with the lens 16 in its passageway 32. Pin 92 may be tapered as illustrated, and includes a groove 94 for engagement with shoulders 96 of sidewall segments 98 of receptacle 90. Pin 92 may include features for facilitating its removal, such as finger pulls 100. The pin 92 is removed by, for example, simply wiggling it loose. FIG. 8 illustrates a perspective and top view of one embodiment of receptacle 90.

Figure 10:
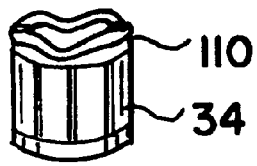
Figure 9:
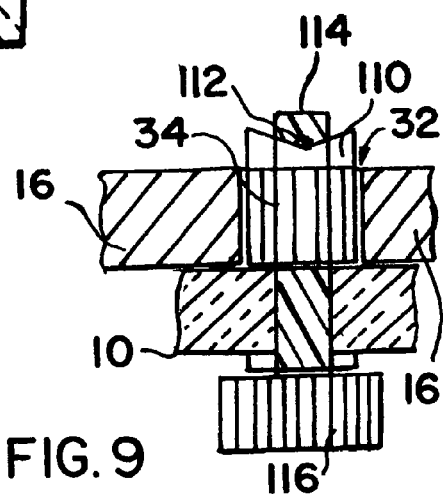
FIGS. 9 (sectional view) and 10 illustrate another particular embodiment of a frame-lens coupling apparatus according to one aspect of the present invention.

FIGS. 9 and 10 illustrate another embodiment of an apparatus according to one aspect of the present invention. As shown in FIG. 9, flexible washer 34 is acted upon by a stop (or "washer") 110 to compress and release the flexible washer 34. Stop 110, which is illustrated in FIG. 10, includes a contoured surface that cooperates with a pin 112 coupled to or formed with a shaft 114. Shaft 114 is coupled to a head 116. As head 116 is turned, for example by finger tightening or releasing, the shaft 114 and pin 112 turn. As they turn, the pin 112 cooperates with the contour of the stop 110 to either compress or relax the flexible washer 34. When compressed and expanded, as discussed above, the flexible washer 34 engages with the lens 16 in its passageway 32.

Although a pin 112 is illustrated, and feature may be used to engage the stop 110. For example, and without limitation, shaft 114 may be formed with features, such as knobs, that engage the stop 110. Also, although a separate washer 34 is discussed, the flexible engaging member may be formed as part of the frame 10.

The present invention facilitates the easy coupling or releasing of lenses from frames. Therefore, for example, if a wearer's prescription changes, or if lenses become damaged, replacement lenses may be easily coupled to the original frames. As another example, different lenses are often more suitable for different environments or uses, and a wearer may desire to change out lenses accordingly, while using the same frame. For example, and without limitation, a wearer may desire to change from sunglasses lenses to lenses with a bifocal reader segment, or from lenses with one color tint to another color tint. With the present invention, swapping lenses may be quickly and easily accomplished.

Although certain embodiments are described in connection with screws, and others with bolts, it should be understood that either screws or bolts may be used in any such embodiments.

The particular embodiments and descriptions provided herein are illustrative examples only, and features and advantages of each example may be interchanged with, or added to the features and advantages in the other embodiments and examples herein. Moreover, as examples, they are meant to be without limitation as to other possible embodiments, are not meant to limit the scope of the present invention to any particular described detail, and the scope of the invention is meant to be broader than any example. Also, the present invention has several aspects, as described above, and they may stand alone, or be combined with some or all of the other aspects. Furthermore, within this description, the singular word "frame" and its plural "frames" may be interchanged, for example, so that a single pair of glasses may be described as including either a "frame" or "frames."

And, in general, although the present invention has been described in detail, it should be understood that various changes, alterations, substitutions, additions and modifications can be made without departing from the intended scope of the invention, as defined in the following claims.

What is claimed is:

1. Eyeglasses, comprising:
   at least one lens having a passageway, the passageway having a minimum inside passageway diameter;
   a frame;
   a flexible washer positioned within the lens passageway; and
   a compressing member operable to compress the flexible washer such that the washer engages with the lens within the lens passageway to couple the lens and the frame, the compressing member having a maximum outside diameter that is less than the minimum inside passageway diameter.

2. The eyeglasses of claim 1, wherein the compressing member is a screw.

3. The eyeglasses of claim 2, wherein the eyeglasses have an inside side, and wherein the screw comprises a head positioned on the inside side.

4. The eyeglasses of claim 2, and further comprising a receptacle coupled to the frame, and wherein the screw screws into the receptacle.

5. The eyeglasses of claim 1, wherein the compressing member is a nut, and further comprising a bolt, the nut operating in cooperation with the bolt.

6. The eyeglasses of claim 5, wherein the eyeglasses have an outside side, and wherein the bolt comprises a head positioned on the outside side, wherein the head has a diameter of any size.

7. The eyeglasses of claim 1, and further comprising a threaded shaft coupled to the frame, and wherein the compressing member comprises a nut threaded onto the threaded shaft.

8. The eyeglasses of claim 7, wherein the threaded shaft passes through the flexible washer.

9. The eyeglasses of claim 1, wherein the flexible washer is an expandable receptacle, and wherein the compressing member is a pin shaped to engage with the expandable receptacle to expand the expandable receptacle for engagement with the lens.

10. Eyeglasses, comprising:
    at least one lens having a passageway;
    a frame;
    a flexible washer positioned within the lens passageway; and
    a compressing member operable to compress the flexible washer such that the washer engages with the lens within the lens passageway to couple the lens and the frame, wherein the compressing member comprises a contoured stop and a cam, the cam being rotatable for cooperation with the contoured stop to compress the flexible washer.

11. The eyeglasses of claim 10, and further comprising a post coupled to the frame and lever coupled to the cam, wherein the cam rotates on the post.

12. Eyeglasses, comprising:
    at least one lens having a passageway;
    a frame;
    a flexible washer positioned within the lens passageway; and
    a cam mechanism operable to compress the flexible washer such that the washer engages with the lens within the lens passageway to couple the lens and the frame.

13. Eyeglasses, comprising:
    at least one lens having a passageway;
    a frame;
    a flexible washer positioned within the lens passageway; and
    a compressing member operable to compress the flexible washer such that the washer engages with the lens within the lens passageway to couple the lens and the frame, wherein the compressing member comprises a contoured stop and a shaft having one or more contour engaging features for cooperating with the contoured stop, the shaft being rotatable such that the one or more contour engaging features push the stop to compress the flexible washer.

* * * * *